(12) United States Patent
Miyamoto et al.

(10) Patent No.: US 11,262,075 B2
(45) Date of Patent: Mar. 1, 2022

(54) GAS TURBINE COMBUSTOR

(71) Applicant: MITSUBISHI HEAVY INDUSTRIES, LTD., Tokyo (JP)

(72) Inventors: Kenji Miyamoto, Tokyo (JP); Satoshi Takiguchi, Tokyo (JP); Keijiro Saito, Tokyo (JP); Kotaro Miyauchi, Kanagawa (JP); Koichi Nishida, Kanagawa (JP); Shinji Akamatsu, Kanagawa (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 508 days.

(21) Appl. No.: 16/089,166

(22) PCT Filed: Mar. 21, 2017

(86) PCT No.: PCT/JP2017/011104
§ 371 (c)(1),
(2) Date: Sep. 27, 2018

(87) PCT Pub. No.: WO2017/169950
PCT Pub. Date: Oct. 5, 2017

(65) Prior Publication Data
US 2020/0300471 A1    Sep. 24, 2020

(30) Foreign Application Priority Data
Mar. 29, 2016 (JP) .............................. JP2016-065392

(51) Int. Cl.
*F23R 3/30* (2006.01)
*F23R 3/28* (2006.01)
(Continued)

(52) U.S. Cl.
CPC .............. *F23R 3/286* (2013.01); *F01D 9/023* (2013.01); *F02C 7/18* (2013.01); *F23R 3/46* (2013.01); *F23R 2900/03042* (2013.01)

(58) Field of Classification Search
CPC .. F01D 9/023; F23R 3/286; F23R 3/46; F23C 2900/07021; F23D 2203/1012; F23D 2203/101; F23D 2203/007; F23D 2209/10
See application file for complete search history.

(56) References Cited

U.S. PATENT DOCUMENTS 6,089,171 A * 7/2000 Fong ......................... F23C 7/02
                                                                            110/263
6,174,469 B1 * 1/2001 Ganan-Calvo ........ B05B 7/0475
                                                                            264/12
(Continued)

FOREIGN PATENT DOCUMENTS

CN    101813315    8/2010
CN    104169651    11/2014
(Continued)

OTHER PUBLICATIONS

International Search Report dated May 30, 2017 in International (PCT) Application No. PCT/JP2017/011104, with English Translation.
(Continued)

*Primary Examiner* — Todd E Manahan
*Assistant Examiner* — Marc J Amar
(74) *Attorney, Agent, or Firm* — Wenderoth, Lind & Ponack, L.L.P.

(57) ABSTRACT

A gas turbine combustor provided with: a plurality of swirler tubes that are disposed inside a combustor basket and impart a swirl to a premixed gas, the premixed gas being obtained by premixing a fuel and air for combustion; and an outer ring that is disposed between the plurality of swirler tubes and the combustor basket with a gap provided between the outer
(Continued)

ring and the combustor basket, and generates film-shaped air inside a combustor transition piece connected to the combustor basket via injection through the gap into the combustor transition piece, and at a downstream end of the outer ring, the outer ring includes a tapered surface formed such that the outer ring gradually decreases in thickness from an upstream side toward a downstream side.

2 Claims, 4 Drawing Sheets

(51) Int. Cl.
  *F23R 3/46* (2006.01)
  *F01D 9/02* (2006.01)
  *F02C 7/18* (2006.01)

(56) References Cited

U.S. PATENT DOCUMENTS

| | | | |
|---|---|---|---|
| 7,090,205 B2 | 8/2006 | Oda et al. | |
| 8,443,607 B2 | 5/2013 | York et al. | |
| 9,926,845 B2 | 3/2018 | Nakamura et al. | |
| 9,989,258 B2 | 6/2018 | Saito et al. | |
| 10,107,501 B2 | 10/2018 | Takiguchi et al. | |
| 2003/0024526 A1* | 2/2003 | Ganan-Calvo | A61M 15/0065 128/200.14 |
| 2004/0021235 A1* | 2/2004 | Corr, II | F23R 3/286 261/79.1 |
| 2004/0050061 A1* | 3/2004 | Schmotolocha | F23R 3/14 60/761 |
| 2005/0241314 A1* | 11/2005 | Takaya | F01D 9/023 60/752 |
| 2010/0212322 A1* | 8/2010 | York | F23D 14/64 60/738 |
| 2011/0239652 A1* | 10/2011 | McMahan | F23R 3/286 60/737 |
| 2011/0239653 A1* | 10/2011 | Valeev | F23R 3/34 60/740 |
| 2012/0247110 A1* | 10/2012 | Clemen | F23R 3/16 60/737 |
| 2013/0219897 A1* | 8/2013 | Nakamura | F23R 3/06 60/737 |
| 2013/0219898 A1 | 8/2013 | Nakamura et al. | |
| 2014/0123649 A1* | 5/2014 | Portillo Bilbao | F02C 7/24 60/725 |
| 2016/0273776 A1* | 9/2016 | Takiguchi | F23R 3/54 |
| 2018/0195726 A1* | 7/2018 | Witham | F23D 11/107 |
| 2020/0088402 A1* | 3/2020 | Kendrick | F23D 14/62 |

FOREIGN PATENT DOCUMENTS

| | | |
|---|---|---|
| CN | 105051458 | 11/2015 |
| JP | 2005-180729 | 7/2005 |
| JP | 2005-315457 | 11/2005 |
| JP | 2007-147125 | 6/2007 |
| JP | 2007147125 A * | 6/2007 |
| JP | 2010-197039 | 9/2010 |
| JP | 2013-190196 | 9/2013 |
| JP | 2013190196 A * | 9/2013 |
| JP | 2014-092286 | 5/2014 |
| JP | 2014-181886 | 9/2014 |
| WO | 2013/128739 | 9/2013 |
| WO | 2014/148567 | 9/2014 |

OTHER PUBLICATIONS

Written Opinion of the International Searching Authority dated May 30, 2017 in International (PCT) Application No. PCT/JP2017/011104, with English Translation

* cited by examiner

GAS TURBINE COMBUSTOR

TECHNICAL FIELD

The present invention relates to a gas turbine combustor.

BACKGROUND ART

In recent years, more and more gas turbine combustors employ the premixed combustion method for reduction of NOx and other similar purposes. Such a gas turbine combustor, employing the premixed combustion method, includes a pilot burner that performs diffusion combustion in addition to main burners (premix burners) that perform premixed combustion. In this way, the main burners can use a diffusion flame generated by the pilot burner as a pilot to generate premixed flames. Thus, by using this diffusion flame to combust a premixed gas produced by the main burners, premixed combustion is possible.

PRIOR ART DOCUMENTS

Patent Documents

Patent Document 1: Japanese Patent Application Publication No. 2014-92286
Patent Document 2: Japanese Patent Application Publication No. 2005-315457

SUMMARY OF THE INVENTION

Problem to be Solved by the Invention

However, around the exit of each main burner, the premixed gas flows along its inner peripheral surface. Thus, due to the development of a boundary layer, a spot with lower flow speed appears. At this spot with lower flow speed, a region with a high fuel concentration is sometimes formed from the premixed gas. If a low speed, high fuel concentration region is formed around the exit of the main burner as above, so-called flashback may possibly occur, in which a flame generated downstream of this region spreads to it.

For this reason, various gas turbine combustors that can suppress the occurrence of flashback have been studied (see Patent Documents 1 and 2). For example, as illustrated in FIG. 4, a gas turbine combustor 100 includes a plurality of swirler tubes 131 that are provided radially outward of a pilot cone 121 and impart a swirl to a premixed gas Fp, and an outer ring 115 that is disposed radially outward of the plurality of swirler tubes 131 with a gap 141 provided between the outer ring 115 and a combustor basket 111. By injecting compressed intake air through the gap 141, film-shaped air Af flows along the inner peripheral surface of a combustor transition piece (or exit outer ring) 112. In this way, the gas turbine combustor 100 prevents (wall surface) flashback fb along the inner peripheral surface of the combustor transition piece 112, which is a low flow speed region within the boundary layer.

However, in the above gas turbine combustor 100, as illustrated in FIG. 5, a downstream end portion 115a of the outer ring 115 forms a step. As the compressed air and the premixed gas Fp flow downstream along an outer peripheral surface 115c and an inner peripheral surface 115b of the outer ring 115, the flow of the compressed air separates from the outer peripheral surface 115c of the outer ring 115 and forms a stagnation S1, while the flow of the premixed gas Fp separates from the inner peripheral surface 115b of the outer ring 115 and forms a stagnation, so that a low flow speed region is formed at this spot. Thus, there is a possibility that the region with the stagnations become a flame holding spot and flashback occurs there.

Given the above, the present invention has been made to solve a problem as described above and an object thereof is to provide a gas turbine combustor capable of suppressing the occurrence of flashback at a downstream end portion of its outer ring with a simple configuration.

Means for Solving the Problem

A gas turbine combustor according to a first aspect of the invention to solve the above problem includes:
a plurality of swirler tubes that are disposed inside a combustor basket and impart a swirl to a premixed gas, the premixed gas being obtained by premixing a fuel and air for combustion; and
an outer ring that is disposed between the plurality of swirler tubes and the combustor basket with a gap provided between the outer ring and the combustor basket, and generates film-shaped air inside a combustor transition piece connected to the combustor basket via injection through the gap into the combustor transition piece, and
at a downstream end of the outer ring, the outer ring includes a tapered surface formed such that the outer ring gradually decreases in thickness from an upstream side toward a downstream side.

A gas turbine combustor according to a second aspect of the invention to solve the above problem is the gas turbine combustor according to the first aspect of the invention, in which the tapered surface is formed on an inner peripheral surface side of the outer ring.

A gas turbine combustor according to a third aspect of the invention to solve the above problem is the gas turbine combustor according to the first aspect of the invention, in which the tapered surface is formed on both of an inner peripheral surface side and an outer peripheral surface side of the outer ring.

A gas turbine combustor according to a fourth aspect of the invention to solve the above problem is the gas turbine combustor according to the first aspect of the invention, in which the tapered surface is formed on an outer peripheral surface side of the outer ring.

A gas turbine combustor according to a fifth aspect of the invention to solve the above problem is the gas turbine combustor according to any one of the first to fourth aspects of the invention, in which the tapered surface has a shape of a curved line in a cross section thereof taken along a central axis of the outer ring.

A gas turbine combustor according to a sixth aspect of the invention to solve the above problem is the gas turbine combustor according to any one of the first to fourth aspects of the invention, in which the tapered surface has an angle of 30 degrees to 60 degrees with respect to a radial direction.

Effect of the Invention

According to the present invention, at the downstream end of the outer ring, the outer ring includes a tapered surface formed such that the outer ring gradually decreases in thickness from the upstream side toward the downstream side. In this way, a premixed gas or compressed air flows downstream smoothly along the inner peripheral surface or the outer peripheral surface of the outer ring. This prevents separation of the flow of the premixed gas or the compressed air at a downstream end portion of the outer ring, so that the stagnation region formed by separation of the gas flow is smaller. It is therefore possible to suppress the occurrence of flashback at the downstream end portion of the outer ring with a simple configuration.

DETAILED DESCRIPTION OF THE INVENTION

Embodiments of a gas turbine combustor according to the present invention will be described with reference to drawings. However, the present invention is not limited only to the following embodiments to be described with reference to drawings.

First Embodiment

A gas turbine combustor according to a first embodiment of the present invention will be described with reference to FIG. 1. Note that reference sign C1 in FIG. 1 denotes the central axis of a combustor basket.

Figure 1A:
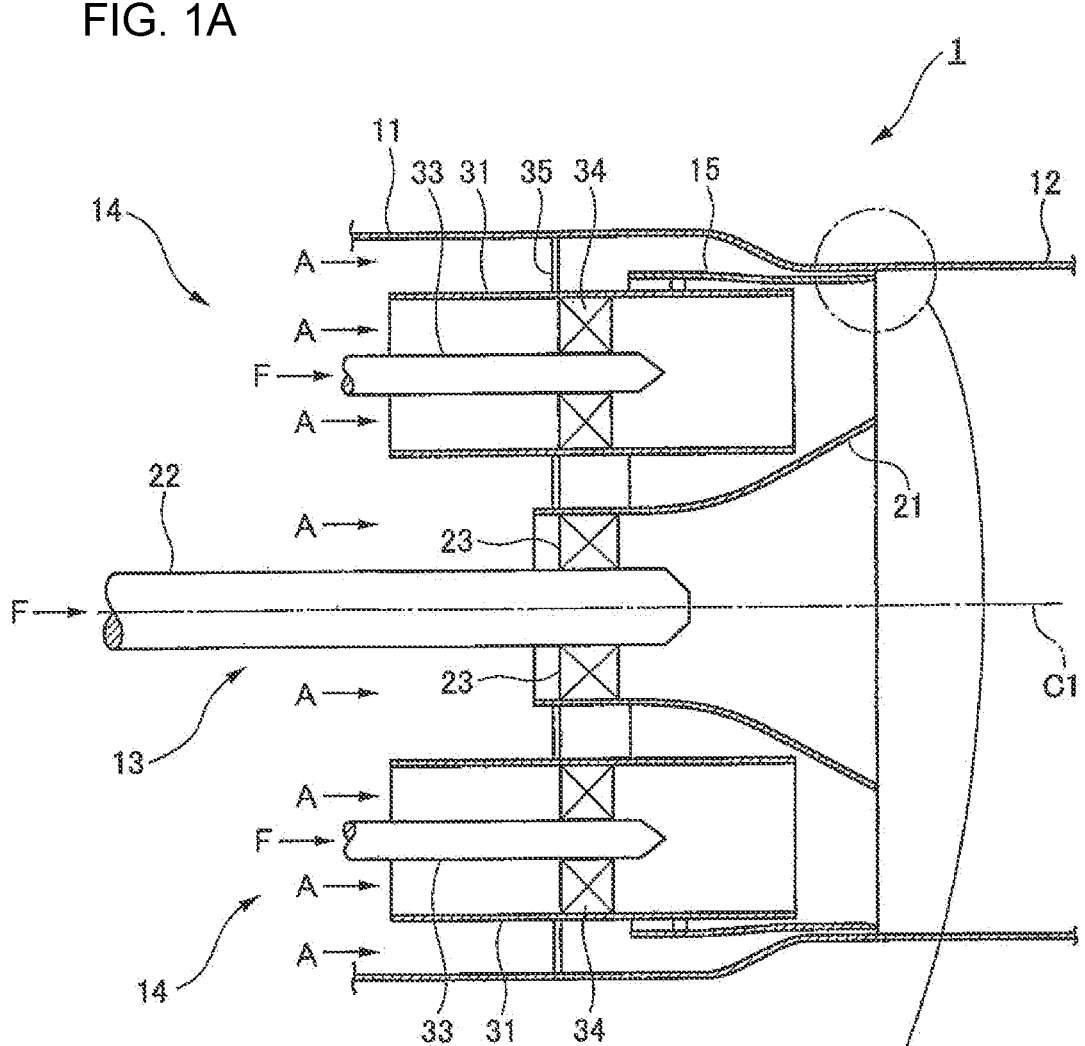
FIG. 1A is a diagram schematically illustrating the internal configuration of a gas turbine combustor according to a first embodiment of the present invention.
Figure 1B:
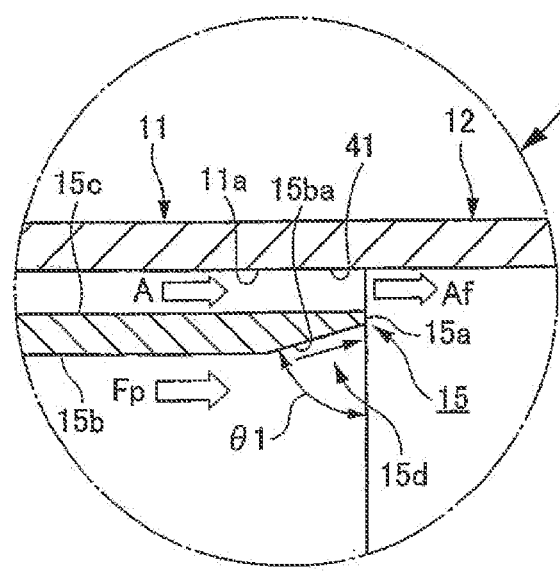
FIG. 1B is an enlarged view of the identified portion of FIG. 1A.

As illustrated in FIG. 1, a gas turbine combustor 1 employs the premixed combustion method and includes a combustor basket 11 that mixes a fuel F and compressed air A for combustion and a combustor transition piece 12 as a combustion chamber that is connected to a downstream end portion (rear end portion) of this combustor basket 11. Further, a pilot burner 13 and a plurality of main burners (premix burners) 14 are housed in an upstream end portion (front end portion) of the combustor basket 11.

The pilot burner 13 is disposed coaxially with the combustor basket 11 and includes a pilot cone 21, a pilot nozzle 22, and a pilot swirler 23. The pilot nozzle 22 is inserted in the pilot cone 21 coaxially with the pilot cone 21. The pilot swirler 23 is interposed between the inner peripheral surface of the pilot cone 21 and the outer peripheral surface of the pilot nozzle 22.

The main burners 14 are provided radially outward of the pilot burner 13 at equal angular intervals in the circumferential direction of the combustor basket 11 and each include a swirler tube 31, a main nozzle (premix nozzle) 33, and a main swirler 34. Inside the swirler tube 31, the main nozzle 33 is inserted coaxially with the swirler tube 31. Moreover, the main swirler 34 is interposed between the inner peripheral surface of the swirler tube 31 and the outer peripheral surface of the main nozzle 33. The swirler tube 31 is supported on the inner peripheral surface of the combustor basket 11 through a base plate 35.

The above gas turbine combustor 1 further includes an outer ring 15 between the plurality of swirler tubes 31 and the combustor basket 11 coaxially with the combustor basket 11 with a gap 41 provided between the outer ring 15 and the combustor basket 11. The outer ring 15 is supported on the outer peripheral surfaces of the swirler tubes 31 provided respectively to the plurality of main burners 14 through fixtures such as welds. The outer ring 15, on its downstream side, includes an inner peripheral surface-side tapered surface 15ba provided on an inner peripheral surface (radially inner portion) 15b side such that the outer ring 15 gradually decreases in thickness from the upstream side toward the downstream side. In other words, the outer ring 15 includes the inner peripheral surface-side tapered surface 15ba at a downstream end 15d of the outer ring 15. The downstream side of the inner peripheral surface-side tapered surface 15ba connects to a downstream end portion 15a of the outer ring 15. In this way, a premixed gas Fp guided downstream along the inner peripheral surface 15b of the outer ring 15 flows downstream smoothly at high flow speed, owing to the inner peripheral surface-side tapered surface 15ba.

Next, the operation of the gas turbine combustor 1 while it is run will be described.

While the gas turbine combustor 1 is run, the compressed air A at high temperature and high pressure flows into the upstream end portion of the combustor basket 11 and is then supplied into the pilot burner 13 and the main burners 14, while the fuel F is supplied into their pilot nozzle 22 and main nozzles 33.

Here, inside the pilot burner 13, first, the supplied compressed air A is swirled by the pilot swirler 23, so that the compressed air A is mixed with the fuel F injected from the pilot nozzle 22. Then, by igniting the fuel mixed gas obtained by this mixing, diffusion combustion is performed inside the pilot cone 21 and the downstream side thereof (inside the combustor transition piece 12). Thereafter, the combustion gas generated by that diffusion combustion is supplied to the turbine side in the combustor transition piece 12.

On the other hand, inside each main burner 14, first, the supplied compressed air A is swirled by the main swirler 34, so that the compressed air A is mixed with the fuel F injected from the main nozzle 33, so that the premixed gas Fp is produced. Then, the swirled premixed gas Fp is guided downstream by the outer ring 15 and the pilot cone 21 to be supplied toward the inside of the combustor transition piece 12. Here, the premixed gas Fp guided downstream along the inner peripheral surface 15b of the outer ring 15 flows downstream smoothly, owing to the inner peripheral surface-side tapered surface 15ba. Thereafter, the premixed gas Fp supplied into the combustor transition piece 12 is combusted by the diffusion flame generated by the pilot burner 13, so that premixed combustion is performed.

Here, while the gas turbine combustor 1 is run as above, the compressed air A is supplied around each main burner 14 as well. Thus, that compressed air A is constantly taken into the combustor transition piece 12 through a gap (air path) 41 between an inner peripheral surface 11a of the combustor basket 11 and an outer peripheral surface 15c of the outer ring 15. Specifically, as the compressed air A is injected into the combustor transition piece 12 through the gap 41, the compressed air A becomes film-shaped air (hereinafter, referred to as film air) Af, and this film air Af flows along the inner peripheral surface of the combustor transition piece 12 toward its downstream side.

Thus, the gas turbine combustor 1 according to this embodiment includes the outer ring 15, which is disposed between the plurality of swirler tubes 31 and the combustor basket 11 with the gap 41 provided between the outer ring 15 and the combustor basket 11 and generates the film air Af inside the combustor transition piece 12, connected to the combustor basket 11, via injection through the gap 41 into the combustor transition piece 12. At the downstream end 15d of the outer ring 15, the outer ring 15 includes the inner peripheral surface-side tapered surface 15ba, which is formed on the inner peripheral surface 15b side such that the outer ring 15 gradually decreases in thickness from the upstream side toward the downstream side. The premixed gas Fp guided downstream along the inner peripheral surface 15b of the outer ring 15 flows smoothly at high flow speed from the upstream side toward the downstream side, owing to the inner peripheral surface-side tapered surface 15ba. This prevents separation of the flow of the premixed gas Fp at the downstream end portion 15a of the outer ring 15, so that the stagnation region formed by separation of the gas flow is smaller. Thus, the occurrence of flashback at the downstream end portion 15a of the outer ring 15 is suppressed with a simple configuration. Also, since the film air Af promotes the mixing of the premixed gas Fp, NOx can be expected to be lower. Accordingly, the combustion is stabilized and decrease in combustion efficiency is suppressed.

Also, it is preferable for the inner peripheral surface-side tapered surface 15ba to have an angle θ1 within the range of 30 degrees to 60 degrees with respect to the radial direction since, in this way, the premixed gas Fp guided downstream along the inner peripheral surface 15b of the outer ring 15 flows downstream more smoothly.

Second Embodiment

A gas turbine combustor according to a second embodiment of the present invention will be described with reference to FIG. 2.

Note that this embodiment is an embodiment in which only the outer ring is changed. Besides that, this embodiment includes the same members as those in the gas turbine combustor according to the above first embodiment. In this embodiment, the same members as those in the gas turbine combustor according to the above first embodiment will be denoted by the same reference signs and description thereof will be omitted as appropriate. FIG. 2 illustrates only the internal structure of the upper half of the gas turbine combustor.

Figure 2A:
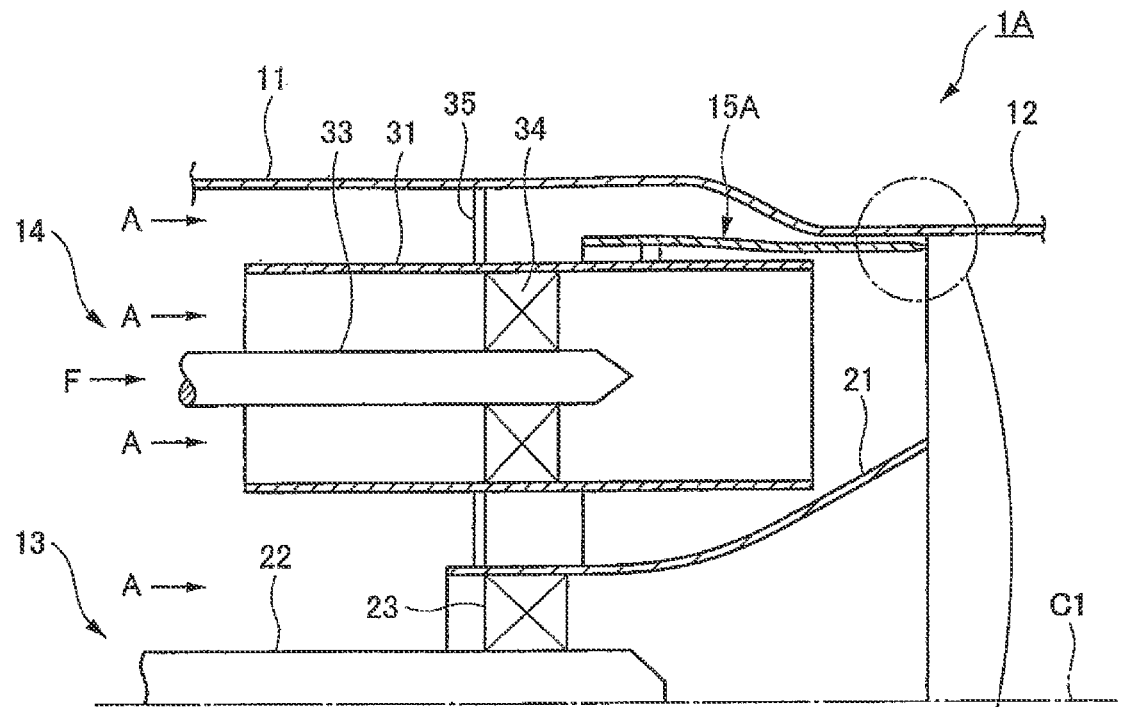
FIG. 2A is a diagram schematically illustrating the internal configuration of a gas turbine combustor according to a second embodiment of the present invention.
Figure 2B:
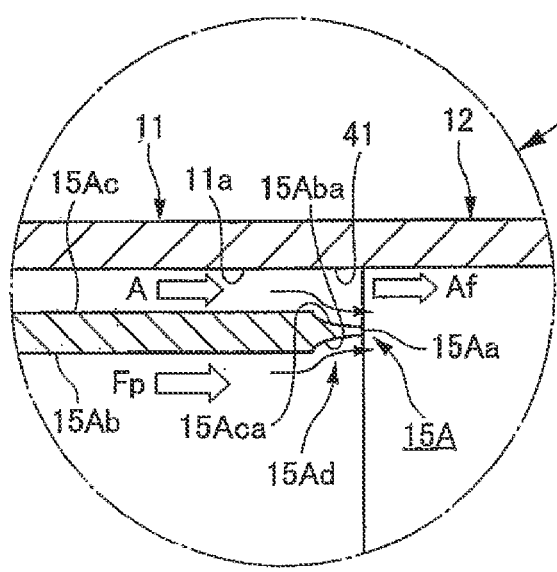
FIG. 2B is an enlarged view of the identified portion of FIG. 2A.

As illustrated in FIG. 2, a gas turbine combustor 1A according to this embodiment includes a pilot burner 13 and main burners 14 housed in a combustor basket 11, and a combustor transition piece 12 connected to the combustor basket 11, similarly to the gas turbine combustor 1 according to the above first embodiment, and also includes an outer ring 15A disposed between a plurality of swirler tubes 31 of the main burners 14 and the combustor basket 11 coaxially with the combustor basket 11 with a gap 41 provided between the outer ring 15A and an inner peripheral surface 11a of the combustor basket 11. Note that, similarly to the outer ring 15, the outer ring 15A is supported on the outer peripheral surfaces of the swirler tubes 31 provided respectively to the plurality of main burners 14 through fixtures such as welds.

The outer ring 15A, on its downstream side, includes an inner peripheral surface-side tapered surface 15Aba and an outer peripheral surface-side tapered surface 15Aca formed such that the outer ring 15A gradually decreases in thickness from the upstream side toward the downstream side. Specifically, the outer ring 15A includes the inner peripheral surface-side tapered surface 15Aba and the outer peripheral surface-side tapered surface 15Aca at a downstream end 15Ad of the outer ring 15A. The inner peripheral surface-side tapered surface 15Aba is formed on an inner peripheral surface (radially inner portion) 15Ab side of the outer ring 15A. The outer peripheral surface-side tapered surface 15Aca is formed on an outer peripheral surface (radially outer portion) 15Ac side of the outer ring 15A. The inner peripheral surface-side tapered surface 15Aba has the shape of a curved surface convex to the outer peripheral surface 15Ac. The outer peripheral surface-side tapered surface 15Aca has the shape of a curved surface convex to the inner peripheral surface 15Ab. Specifically, the inner peripheral surface-side tapered surface 15Aba and the outer peripheral surface-side tapered surface 15Aca have the shapes of curved lines in cross sections thereof taken along the central axis of the outer ring 15A. Also, the downstream sides of the inner peripheral surface-side tapered surface 15Aba and the outer peripheral surface-side tapered surface 15Aca connect to a downstream end portion 15Aa of the outer ring 15A. In this way, a premixed gas Fp guided downstream along the inner peripheral surface 15Ab of the outer ring 15A flows downstream smoothly at high flow speed, owing to the inner peripheral surface-side tapered surface 15Aba. Compressed air A guided downstream along the outer peripheral surface 15Ac of the outer ring 15A flows downstream smoothly at high flow speed, owing to the outer peripheral surface-side tapered surface 15Aca.

Thus, the gas turbine combustor 1A according to this embodiment includes the outer ring 15A, which is disposed between the plurality of swirler tubes 31 and the combustor basket 11 with the gap 41 provided between the outer ring 15A and the combustor basket 11 and generates film air Af inside the combustor transition piece 12, connected to the combustor basket 11, via injection through the gap 41 into the combustor transition piece 12. At the downstream end 15Ad of the outer ring 15A, the outer ring 15A includes the inner peripheral surface-side tapered surface 15Aba and the outer peripheral surface-side tapered surface 15Aca, which are formed respectively on the inner peripheral surface 15Ab side and the outer peripheral surface 15Ac side such that the outer ring 15A gradually decreases in thickness from the upstream side toward the downstream side. The premixed gas Fp guided downstream along the inner peripheral surface 15Ab of the outer ring 15A flows smoothly at high flow speed from the upstream side toward the downstream side, owing to the inner peripheral surface-side tapered surface 15Aba, while the compressed air A guided downstream along the outer peripheral surface 15Ac of the outer ring 15A flows smoothly at high flow speed from the upstream side toward the downstream side, owing to the outer peripheral surface-side tapered surface 15Aca. This prevents separation of the flow of the premixed gas Fp and separation of the flow of the compressed air A at the downstream end portion 15Aa of the outer ring 15A, so that the stagnation region formed by separation of the gas flows is smaller. Thus, the occurrence of flashback at the downstream end portion 15Aa of the outer ring 15A is suppressed with a simple configuration. Since the film air Af promotes the mixing of the premixed gas Fp, NOx can be expected to be lower. Further, since the premixed gas Fp does not flow outward, the premixer Fp is less likely to flow toward the inner wall of the combustor transition piece 12, and the occurrence of flashback at a wall surface boundary layer can be expected to be suppressed as well. Accordingly, the combustion is stabilized and decrease in combustion efficiency is suppressed.

Also, since the inner peripheral surface-side tapered surface 15Aba and the outer peripheral surface-side tapered surface 15Aca have the shapes of curved lines in cross sections thereof taken along the central axis of the outer ring 15A, the premixed gas Fp and the compressed air A flow more smoothly than when these portions are straight in the cross sections thereof taken along the central axis of the outer ring 15A. Thus, the stagnation region formed at the downstream end portion 15Aa of the outer ring 15A by separation of the gas flows is smaller than when the tapered surfaces are straight in the cross sections thereof taken along the central axis of the outer ring 15A. Hence, the occurrence of flashback at the downstream end portion 15Aa of the outer ring 15A is suppressed to a greater extent with a simple configuration. Accordingly, the combustion is stabilized to a greater extent and decrease in combustion efficiency is suppressed to a greater extent.

Third Embodiment

A gas turbine combustor according to a third embodiment of the present invention will be described with reference to FIG. 3.

Note that this embodiment is an embodiment in which only the outer ring is changed. Besides that, this embodiment includes the same members as the gas turbine combustor according to the above first embodiment. In this embodiment, the same members as the gas turbine combustor according to the above first embodiment will be denoted by the same reference signs and description thereof will be omitted as appropriate. FIG. 3 illustrates only the internal structure of the upper half of the gas turbine combustor.

Figure 3A:
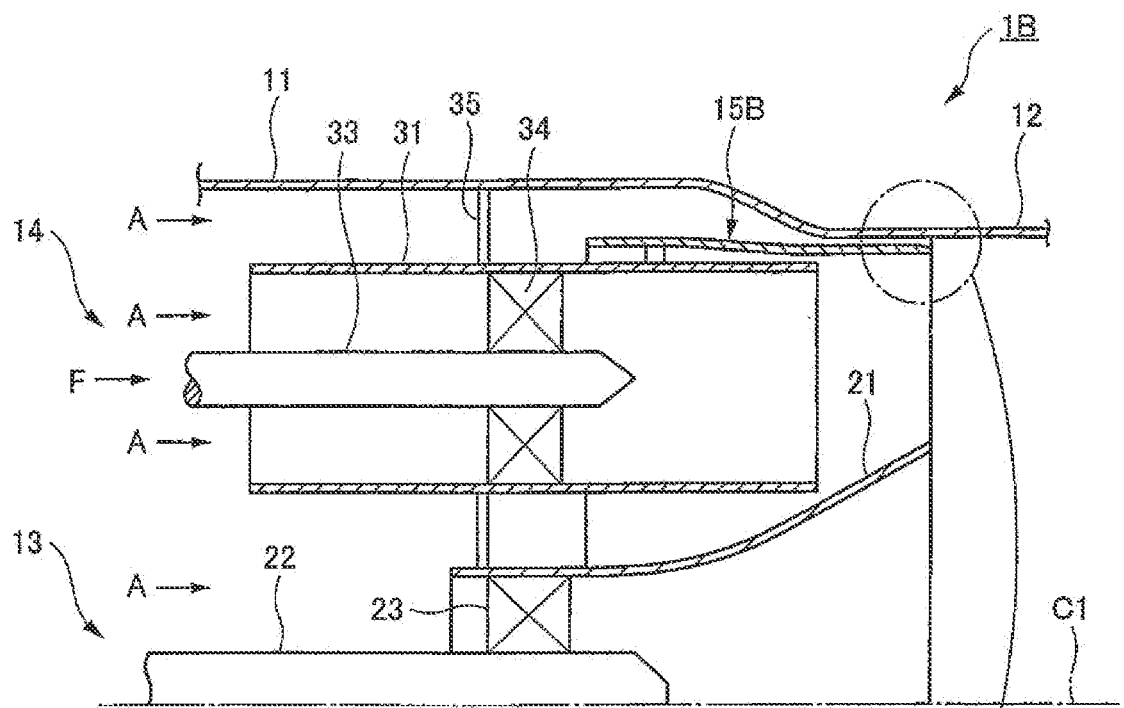
FIG. 3A is a diagram schematically illustrating the internal configuration of a gas turbine combustor according to a third embodiment of the present invention.
Figure 3B:
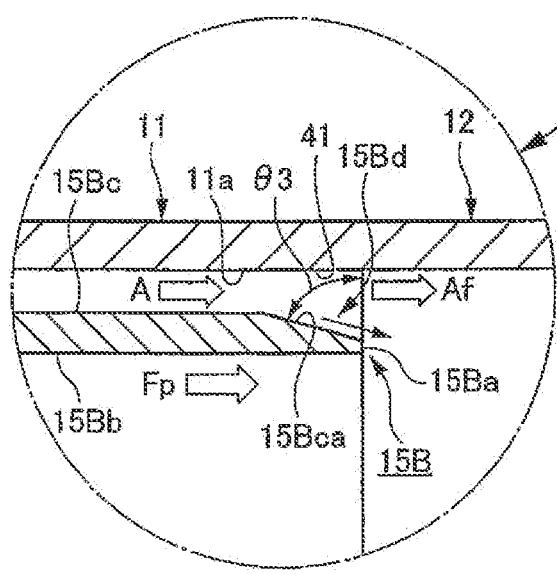
FIG. 3B is an enlarged view of the identified portion for FIG. 3A.
Figure 4:
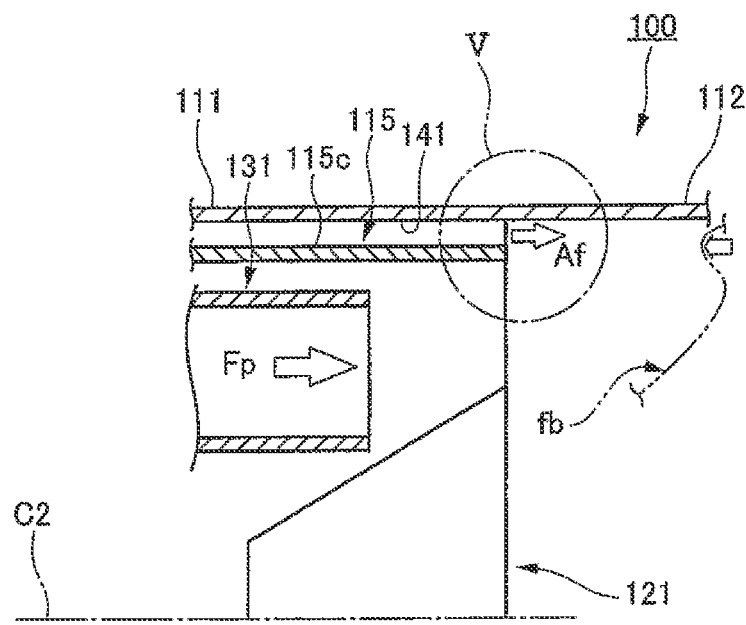
FIG. 4 is a schematic diagram illustrating an example of a conventional gas turbine combustor.
Figure 5:
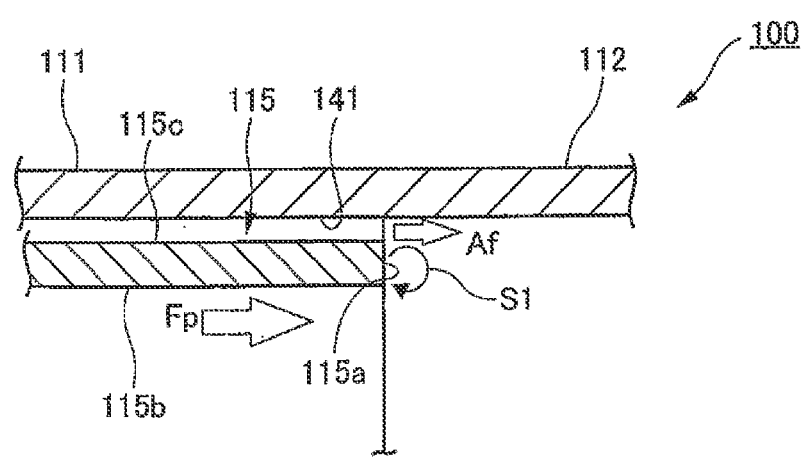
FIG. 5 is an enlarged view of a circle V in FIG. 4.

As illustrated in FIG. 3, a gas turbine combustor 1B according to this embodiment includes a pilot burner 13 and main burners 14 housed in a combustor basket 11, and a combustor transition piece 12 connected to the combustor basket 11, similarly to the gas turbine combustor 1 according to the above first embodiment, and also includes an outer ring 15B disposed between a plurality of swirler tubes 31 of the main burners 14 and the combustor basket 11 coaxially with the combustor basket 11 with a gap 41 provided between the outer ring 15B and an inner peripheral surface 11a of the combustor basket 11. Note that, similarly to the outer ring 15, the outer ring 15B is supported on the outer peripheral surfaces of the swirler tubes 31 provided respectively to the plurality of main burners 14 through fixtures such as welds.

The outer ring 15B, on its downstream side, includes an outer peripheral surface-side tapered surface 15Bca formed such that the outer ring 15B gradually decreases in thickness from the upstream side toward the downstream side. Specifically, the outer ring 15B includes the outer peripheral surface-side tapered surface 15Bca at a downstream end 15Bd of the outer ring 15B. The outer peripheral surface-side tapered surface 15Bca is formed on an outer peripheral surface (radially outer portion) 15Bc side of the outer ring 15B. Also, the downstream side of the outer peripheral surface-side tapered surface 15Bca connects to a downstream end portion 15Ba of the outer ring 15B. In this way, compressed air A guided downstream along the outer peripheral surface 15Bc of the outer ring 15B flows downstream smoothly at high flow speed, owing to the outer peripheral surface-side tapered surface 15Bca. Note that a premixed gas Fp guided downstream along an inner peripheral surface 15Bb of the outer ring 15B is supplied as is into the combustor transition piece 12.

Thus, the gas turbine combustor 1B according to this embodiment includes the outer ring 15B, which is disposed between the plurality of swirler tubes 31 and the combustor basket 11 with the gap 41 provided between the outer ring 15B and the combustor basket 11 and generates film air Af inside the combustor transition piece 12, connected to the combustor basket 11, via injection through the gap 41 into the combustor transition piece 12. At the downstream end 15Bd of the outer ring 15B, the outer ring 15B includes the outer peripheral surface-side tapered surface 15Bca, which is formed on the outer peripheral surface 15Bc side such that the outer ring 15B gradually decreases in thickness from the upstream side toward the downstream side. The compressed air A guided downstream along the outer peripheral surface 15Bc of the outer ring 15B flows smoothly at high flow speed from the upstream side toward the downstream side, owing to the outer peripheral surface-side tapered surface 15Bca. This prevents separation of the flow of the compressed air A at the downstream end portion 15Ba of the outer ring 15B, so that the stagnation region formed by separation of the gas flow is smaller. Thus, the occurrence of flashback at the downstream end portion 15Ba of the outer ring 15B is suppressed with a simple configuration. Since the premixed gas Fp does not flow outward and the film air Af, in which the fuel is mixed only in a small amount, flows along the inner wall of the combustor transition piece 12, the occurrence of flashback at a wall surface boundary layer can be expected to be suppressed as well. Accordingly, the combustion is stabilized and decrease in combustion efficiency is suppressed.

Also, it is preferable for the outer peripheral surface-side tapered surface 15Bca to have an angle θ3 within the range of 30 degrees to 60 degrees with respect to the radial direction since, in this way, the compressed air A guided downstream along the outer peripheral surface 15Bc of the outer ring 15B flow downstream more smoothly.

Other Embodiments

It is also possible to apply the above gas turbine combustor 1A to the gas turbine combustors 1 and 1B according to the above first and third embodiments to obtain a gas turbine combustor in which one or both of its inner peripheral surface-side tapered surface and outer peripheral surface-side tapered surface have the shapes of curved surfaces. Such a gas turbine combustor also achieves advantageous effects similar to those by the above gas turbine combustor 1A.

It is also possible to combine the above gas turbine combustors 1 and 1B to obtain a gas turbine combustor including an outer ring with the inner peripheral surface-side tapered surface and the outer peripheral surface-side tapered surface formed in its inner peripheral surface and outer peripheral surface, respectively. Such a gas turbine combustor also achieves advantageous effects similar to those by the above gas turbine combustors 1 and 1B.

It is also possible to apply the above gas turbine combustors 1, 1A, and 1B to a gas turbine combustor including an outer ring shaped such that its downstream end portion extends downstream in the direction of the gas flow beyond the downstream end portion of the pilot cone. Such a gas turbine combustor also achieves advantageous effects similar to those by the above gas turbine combustors 1, 1A, and 1B.

It is also possible to apply the above gas turbine combustors 1, 1A, and 1B to a gas turbine combustor in which the swirler tubes 31 of the plurality of main burners 14 are each provided with an extension tube and to a gas turbine combustor in which an exit outer ring is disposed between its outer ring and combustor basket (combustor transition piece). Such gas turbine combustors also achieve advantageous effects similar to those by the above gas turbine combustors 1, 1A, and 1B.

INDUSTRIAL APPLICABILITY

The gas turbine combustor according to the present invention can suppress the occurrence flashback at a downstream end portion of an outer ring with a simple configuration and is therefore very beneficially usable in industrial applications.

REFERENCE SIGNS LIST 1, 1A, 1B gas turbine combustor
11 combustor basket
12 combustor transition piece
13 pilot burner
14 main burner
15, 15A, 15B outer ring
15a, 15Aa, 15Ba downstream end portion
15b, 15Ab, 15Bb inner peripheral surface
15ba, 15Aba inner peripheral surface-side tapered surface
15c, 15Ac, 15Bc outer peripheral surface
15Aca, 15Bca outer peripheral surface-side tapered surface
15d, 15Ad, 15Bd downstream end
21 pilot cone
22 pilot nozzle
23 pilot swirler
31 swirler tube
33 main nozzle
34 main swirler
35 base plate
41 gap (air flow path)
A compressed air
Af film air
C1 central axis of combustor basket
C2 central axis of combustor basket
F fuel
Fp premixed gas
θ1 angle of inner peripheral surface-side tapered surface
θ3 angle of outer peripheral surface-side tapered surface

The invention claimed is:

1. A gas turbine combustor comprising:
a plurality of swirler tubes that are disposed inside a combustor basket and impart a swirl to a premixed gas, the premixed gas being obtained by premixing a fuel and air for combustion; and
an outer ring that is disposed between the plurality of swirler tubes and the combustor basket with a gap provided between the outer ring and the combustor basket, the gap serving as a space that passes air flowing to a combustor transition piece connected to the combustor basket,
wherein at a downstream end of the outer ring, the outer ring includes a tapered surface formed such that the outer ring gradually decreases in thickness from an upstream side toward a downstream side,
wherein the tapered surface is formed on an inner peripheral surface of the outer ring,
and wherein the tapered surface formed on the inner peripheral surface of the outer ring has a shape of a curved surface convex to the outer peripheral surface of the outer ring.

2. A gas turbine combustor comprising:
a plurality of swirler tubes that are disposed inside a combustor basket and impart a swirl to a premixed gas, the premixed gas being obtained by premixing a fuel and air for combustion; and
an outer ring that is disposed between the plurality of swirler tubes and the combustor basket with a gap provided between the outer ring and the combustor basket, the gap serving as a space that passes air flowing to a combustor transition piece connected to the combustor basket,
wherein at a downstream end of the outer ring, the outer ring includes a tapered surface formed such that the outer ring gradually decreases in thickness from an upstream side toward a downstream side,
wherein the tapered surface is formed on an outer peripheral surface of the outer ring,
and wherein the tapered surface formed on the outer peripheral surface of the outer ring has a shape of a curved surface convex to the inner peripheral surface of the outer ring.

* * * * *